Patented Aug. 14, 1934

1,969,735

UNITED STATES PATENT OFFICE 1,969,735

MANUFACTURE AND USE OF NEW ANTHRAQUINONE DERIVATIVES

George Holland Ellis, Henry Charles Olpin, and Ernest William Kirk, Spondon, near Derby, England, assignors to Celanese Corporation of America, a corporation of Delaware No Drawing. Application October 30, 1930, Serial No. 492,353. In Great Britain November 15, 1929

23 Claims. (Cl. 260—59)

This invention relates to the manufacture of hydroxylated compounds of the anthraquinone series, and to the synthesis therefrom of new colouring matters some of which have excellent affinity for cellulose acetate and other organic substitution derivatives of cellulose.

We have found that valuable hydroxylated compounds of the anthraquinone series may be obtained by acting on chlorinated or other halogenated 1:5-dihydroxyanthraquinones so as to replace at least part of the halogen by hydroxyl, for example by acting on the said halogenated 1:5-dihydroxyanthraquinones with sulphuric acid, preferably in the presence of boric acid, or by the action of an alkali e. g. calcium hydroxide, in the presence of water and copper or a copper compound. Thus for example there may be subjected to the action of concentrated sulphuric acid and boric acid, the dichlor-1:5-dihydroxyanthraquinone obtainable for instance by treating 1:5-dihydroxyanthraquinone with sulphuryl chloride.

The products obtainable in accordance with the invention may contain halogen and especially useful new products are obtained by treating dihalogenated 1:5-dihydroxyanthraquinones with sulphuric acid under conditions no more drastic than suffice to produce products containing only one halogen atom.

In carrying out the new process, sulphuric acid may be employed in various forms, for example as concentrated sulphuric acid or as oleum containing varying percentages of sulphur-trioxide. The acid may be allowed to act in the presence of boric acid or other substances having a catalytic action. The reaction conditions may vary widely and it may be mentioned, by way of example, that very satisfactory results may be obtained by the use of concentrated sulphuric acid containing boric acid at temperatures of 140–200° C.

Any desired halogenated anthrarufin may be employed, for example chlorinated anthrarufin and especially the dichloranthrarufin obtainable by chlorination of anthrarufin e. g. by means of sulphuryl chloride in the presence of nitrobenzene.

According to a further feature of the invention the new products containing halogen and obtainable as hereinbefore described are converted by amidation into new and valuable amidated colouring matters, some of which are particularly suitable for the colouration of materials made of or containing cellulose acetate or other organic substitution derivatives of cellulose.

The amidation process may be effected in any desired manner. Thus for example the hydroxylated products, either as such or in the form of their leuco compounds or other reduction products, may be heated with ammonia or an alkyl, aralkyl or aryl amine, with or without the application of pressure and in the presence or not, of suitable diluents. Where the hydroxylated products are amidated in the form of reduction products, the preparation of the latter and the amidation thereof may if desired be effected in the same liquor. Further the amidation of the reduced products may be effected in presence of an inorganic alkali in the manner described in British Patent No. 310,784, the entire conversion of hydroxylated product into amidated product, comprising reduction, amidation and oxidation of the reduced amidated product, being if desired carried out in the same liquor without isolating intermediate products. Where the amidated products are obtained in the form of reduced compounds they may be oxidized to the corresponding colouring matters in any convenient manner and whether in the amidating liquor or as a separate operation. For instance the oxidation to the finished colouring matter my be effected by means of an aromatic nitro compound added directly to the amidating liquor in the manner described in British Patent No. 316,989.

In effecting amidation there may be employed ammonia, or any desired primary or secondary aliphatic, aromatic or hydro-aromatic amine, whether further substituted or not in the hydrocarbon residue. Examples of such amines are, for instance, mono methylamine or other alkylamines, β-amino-ethyl alcohol or other hydroxylated or otherwise substituted alkylamines, benzylamine, cyclohexylamine, para toluidine, para phenylenediamine, or the like.

The amidated colouring matters thus obtained, especially unsulphonated or mono-sulphonated compounds prepared by amidation with ammonia or alkylamines or hydro aromatic amines, have been found particularly suitable for the colouration of cellulose acetate or other cellulose ester or ether materials. Thus for instance by causing methylamine to react on the chlorine-containing hydroxylated product obtainable from dichloranthrarufin by the action of concentrated sulphuric acid there may be obtained a valuable colouring matter capable of dyeing cellulose acetate in very fast blue shades.

It has further been found that still other colouring matters may be obtained by etherifying either the hydroxylated compounds obtained from halogenated anthrarufins, or the amidated products derived therefrom. In addition, colouring matters may be obtained by etherifying the hydroxylated compounds and then amidating the etherified products in any convenient manner. The etherifying process may comprise for instance alkylation by means of an alkyl halide or a dialkyl-sulphate in the presence of an alkali.

The invention also comprises the application of the aforesaid amidated and/or etherified colouring matters to the colouration of textile or other materials, more particularly threads, yarns, knitted or woven fabrics or other products made of or containing cellulose acetate or other organic substitution derivatives of cellulose, for example cellulose esters such as cellulose formate, propionate, or butyrate, or the product obtained by the treatment of alkalized cellulose with esterifying agents (e. g. the product known as "immunized cotton" obtained by the use of p-toluene-sulpho-chloride), or cellulose ethers, such as methyl, ethyl, or benzyl cellulose, or the corresponding condensation products of cellulose and glycols or other polyhydric alcohols.

The said colouring matters may be applied to textile materials either in the reduced state, that is by a vat process or in the form of free leuco compounds in the manner described in British Patent No. 355,363, or they may be applied in solution where sufficiently soluble in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids e. g. water. Preparations intended for vatting may contain reducing agents, alkali or the like, e. g. alkali salts of hydroxy and polyhydroxy cyclic compounds (see U. S. Patent No. 1,716,720). As dispersing agents particular mention may be made of those described in U. S. Patents Nos. 1,618,413, 1,618,414, 1,694,413 and 1,716,721 and British Patents Nos. 273,819, 322,737 and 323,788; viz. bodies of oily or fatty characteristics, namely higher fatty acids or sulphonated or other derivatives thereof containing salt-forming groups, such as sulphoricinoleic acid or other sulphonated fatty acids or salts of such acids or bodies, for instance their alkali or ammonium salts, used alone or in conjunction with auxiliary solvents as described in U. S. Patents Nos. 1,690,481 and 1,803,008; carbocyclic compounds containing in their structure one or more salt forming groups or salts of such compounds; sulpho-aromatic fatty acids or salts thereof; soluble resin soaps or sodium or other soluble salts of resin acids; and sulphonated products derived from furfural and aromatic compounds or from resins and aromatic compounds.

By dilution with water, the aforesaid preparations containing unreduced colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The invention is illustrated but not limited by the following examples:

Example 1

300 parts of anthrarufin are dissolved in a mixture of 660 parts of sulphuryl chloride and 1800 parts of nitro-benzene, and the whole heated to 100° C. for 6 hours with good agitation.

The mixture is allowed to cool, filtered, washed with benzene and dried.

The whole of the product is then dissolved in 2250 parts of concentrated sulphuric acid, 140 parts of boric acid added and heated at 160–170° for 10 hours. It is then cooled, poured into water, heated to boiling for a few minutes, filtered, washed acid free and dried. The product contains chlorine and is probably 6-chlor-1:4:5-trihydroxyanthraquinone.

Example 2

30 parts of the product obtainable according to Example 1 are dissolved in 300 parts of water containing 12 parts of caustic soda and reduced at 60° C. by the addition of sodium hydrosulphite. The leuco compound is isolated by careful acidification with acetic acid, filtered off and well pressed. The press cake is dissolved in 300 parts methylated spirits, 50 parts 30% methylamine solution added, and the solution re-fluxed for 2 hours. The resulting compound is then oxidized, suitably by pouring into 300 parts of water, heating to 70° C. and adding 20 parts of sodium perborate. The dyestuff is then filtered off, and washed well with water.

The product dyes cellulose acetate in very fast greenish-blue shades.

Example 3

5 parts of the dry product obtainable according to Example 1 are refluxed for some hours with 100 parts of nitrobenzene, 4 parts of p-toluenesulphonic acid methyl ester, and 3 parts of anhydrous sodium carbonate. After cooling the methylated product is separated from the nitro-benzene and washed well with water to remove soluble salts. It dyes cellulose acetate in yellow shades from an aqueous dispersion.

What we claim and desire to secure by Letters Patent is:

1. Process for the production of new anthraquinone derivatives, comprising replacing by hydroxyl at least part of the halogen of a halogenated 1:5-dihydroxyanthraquinone by the action of a saponifying agent.

2. Process for the production of new anthraquinone derivatives, comprising replacing by hydroxyl at least part of the chlorine of a chlorinated 1:5-dihydroxyanthraquinone by the action of sulphuric acid.

3. Process for the production of new anthraquinone derivatives, comprising replacing chlorine in a chlorinated 1:5-dihydroxyanthraquinone by hydroxyl by the action of sulphuric acid in the presence of boric acid.

4. Process for the production of new anthraquinone derivatives, comprising replacing by hydroxyl one halogen atom of a dihalogenated 1:5-dihydroxylanthraquinone by acting on the dihalogenated 1:5-dihydroxyanthraquinone with concentrated sulphuric acid in the presence of boric acid.

5. Process for the production of a new anthraquinone derivative, comprising heating a chlorinated 1:5-dihydroxyanthraquinone with sulphuric acid containing boric acid to a temperature of 140° to 200° C.

6. Process for the production of new anthraquinone derivatives, comprising replacing by hydroxyl, by the action of a saponifying agent, at least part of the chlorine of the dichloranthrarufin obtainable by chlorinating anthrarufin with sulphuryl chloride.

7. Process for the production of new anthraquinone derivatives, comprising replacing by hydroxyl by the action of sulphuric acid, at least part of the chlorine of the dichloranthrarufin obtainable by chlorinating anthrarufin with sulphuryl chloride.

8. Process for the production of new anthraquinone derivatives from the dichloranthrarufin obtainable by chlorinating anthrarufin with sulphuryl chloride comprising heating the said dichloranthrarufin with concentrated sulphuric acid containing boric acid at a temperature of 140° to 200° C.

9. Process for the production of new anthraquinone derivatives, comprising replacing by hydroxyl at least part of the halogen of a halogenated 1:5-dihydroxyanthraquinone by the action of a saponifying agent, and amidating the product.

10. Process for the production of new anthraquinone derivatives, comprising replacing by hydroxyl by the action of sulphuric acid at least part of the chlorine of a chlorinated 1:5-dihydroxyanthraquinone, and amidating the product.

11. Process for the production of new anthraquinone derivatives from chlorinated 1:5-dihydroxyanthraquinone comprising replacing by hydroxyl at least part of the chlorine by the action of sulphuric acid in the presence of boric acid, and amidating the product.

12. Process for the production of new anthraquinone derivatives from the dichloranthrarufin obtainable by chlorinating anthrarufin with sulphuryl chloride, comprising amidating the product obtained by replacing by hydroxyl at least part of the chlorine by means of a saponifying agent.

13. Process for the production of new anthraquinone derivatives from the dichloranthrarufin obtainable by chlorinating anthrarufin with sulphuric acid comprising amidating the product obtained by replacing by hydroxyl at least part of the chlorine by means of sulphuric acid.

14. Process for the production of new anthraquinone derivatives, which comprises replacing by hydroxyl, by means of a saponifying agent, at least part of the halogen of a halogenated 1:5-dihydroxyanthraquinone followed by the operations of etherification and amidation.

15. Process for the production of new anthraquinone derivatives, which comprises replacing by hydroxyl at least part of the chlorine of a chlorinated 1:5-dichloranthraquinone, etherifying the product and subsequently amidating the etherified compound.

16. New products comprising halogen substitution products of 1:4:5-trihydroxyanthraquinone.

17. New products comprising chlorine substitution products of 1:4:5-trihydroxyanthraquinone.

18. A new product comprising a halogen substitution product of a compound of the general formula:

wherein the X's represent hydroxyl or amino groups but at least one is an amino group.

19. A new product comprising a chlorine substitution product of a compound of the general formula:

wherein the X's represent hydroxyl or amino groups but at least one is an amino group.

20. New products comprising etherified halogen substitution products of 1:4:5-trihydroxyanthraquinone.

21. New products comprising etherified chlorine substitution products of 1:4:5-trihydroxyanthraquinone.

22. A new product comprising an etherified halogen substitution product of a compound of the general formula:

wherein the X's represent hydroxyl or amino groups but at least one is an amino group.

23. A new product comprising an etherified chlorine substitution product of a compound of the general formula:

wherein the X's represent hydroxyl or amino groups but at least one is an amino group.

GEORGE HOLLAND ELLIS.
HENRY CHARLES OLPIN.
ERNEST WILLIAM KIRK.